(12) United States Patent
Thomas et al.

(10) Patent No.: US 10,132,012 B2
(45) Date of Patent: Nov. 20, 2018

(54) END-FRAY RESISTANT HEAT-SHRINKABLE WOVEN SLEEVE, ASSEMBLY THEREWITH AND METHODS OF CONSTRUCTION THEREOF

(71) Applicant: Federal-Mogul Powertrain, Inc., Southfield, MI (US)

(72) Inventors: Patrick Thomas, Rue de la Petite Vitesse (FR); Delphine Henin, Choisy-au-Bac (FR)

(73) Assignee: Federal-Mogul Powertrain LLC, Southfield, MI (US)

( * ) Notice: Subject to any disclaimer, the term of this patent is extended or adjusted under 35 U.S.C. 154(b) by 699 days.

(21) Appl. No.: 13/803,225

(22) Filed: Mar. 14, 2013

(65) Prior Publication Data
US 2014/0272218 A1    Sep. 18, 2014

(51) Int. Cl.
| | |
|---|---|
| *D03D 3/02* | (2006.01) |
| *B32B 1/08* | (2006.01) |
| *H02G 3/04* | (2006.01) |
| *D03D 1/00* | (2006.01) |
| *D03D 15/00* | (2006.01) |

(Continued)

(52) U.S. Cl.
CPC ............... *D03D 3/02* (2013.01); *B32B 1/08* (2013.01); *D02G 3/38* (2013.01); *D03D 1/0041* (2013.01); *D03D 15/0027* (2013.01); *D03D 15/0094* (2013.01); *H02G 3/0481* (2013.01);
(Continued)

(58) Field of Classification Search
USPC ........................................................ 156/148
See application file for complete search history.

(56) References Cited

U.S. PATENT DOCUMENTS

| | | |
|---|---|---|
| 4,636,437 A | 1/1987 | Algrim et al. |
| 4,741,087 A | 5/1988 | Plummer, Jr. |
| (Continued) | | |

FOREIGN PATENT DOCUMENTS

| | | |
|---|---|---|
| CN | 101390264 A | 3/2009 |
| CN | 101405529 A | 4/2009 |
| (Continued) | | |

OTHER PUBLICATIONS

International Search Report dated Jul. 22, 2014 (PCT/US2014/019324).

*Primary Examiner* — Jeffry H Aftergut
(74) *Attorney, Agent, or Firm* — Robert L. Stearns; Dickinson Wright, PLLC

(57) ABSTRACT

A woven sleeve, sleeve assembly and methods of construction thereof are provided. The sleeve has a flexible, abrasion resistant, circumferentially closed and continuous elongate wall extending lengthwise along a central axis between opposite ends. The wall is woven with warp yarns extending generally parallel to the central axis and at least one heat-shrinkable weft yarn extending generally transversely to the warp yarns. The warp yarns provide the sleeve with coverage, abrasion resistance and flexibility and the weft yarn provides the ability to shrink the wall about an elongate member being protected within a cavity of the sleeve, as well as providing enhanced crush strength and abrasion resistance. At least one of the warp yarns and/or weft yarn includes at least one low melt, heat-fusible yarn served therewith to enhance resistance to end-fray during a cutting operation.

1 Claim, 3 Drawing Sheets

(51) Int. Cl.
*D02G 3/38* (2006.01)
*H02G 15/18* (2006.01)

(52) U.S. Cl.
CPC ....... *D10B 2401/041* (2013.01); *H02G 15/18* (2013.01); *Y10T 428/1331* (2015.01)

(56) References Cited

U.S. PATENT DOCUMENTS

| | | | |
|---|---|---|---|
| 4,741,873 A * | 5/1988 | Fischer | B29B 11/14 |
| | | | 156/148 |
| 4,785,039 A | 11/1988 | Algrim et al. | |
| 4,842,661 A * | 6/1989 | Miller | A41D 27/245 |
| | | | 156/308.2 |
| 6,003,565 A | 12/1999 | Whittier, II | |
| 6,045,884 A | 4/2000 | Hess et al. | |
| 6,265,039 B1 | 7/2001 | Drinkwater et al. | |
| 6,340,510 B2 | 1/2002 | Hess et al. | |
| 8,273,429 B2 | 9/2012 | Sellis et al. | |
| 2007/0163305 A1 | 7/2007 | Baer et al. | |
| 2009/0218002 A1 | 9/2009 | Kashihara | |
| 2010/0313989 A1 | 12/2010 | Kashihara | |
| 2011/0275268 A1 | 11/2011 | Harris | |
| 2012/0021216 A1 | 1/2012 | Veillat et al. | |
| 2012/0148772 A1 | 6/2012 | Avula | |
| 2012/0315419 A1 | 12/2012 | Sellis et al. | |

FOREIGN PATENT DOCUMENTS

| | | | |
|---|---|---|---|
| CN | 102007239 A | | 4/2011 |
| CN | 102459729 A | | 5/2012 |
| EP | 1371762 | | 5/2009 |
| GB | 2105247 A | * | 3/1983 |
| JP | H04000682 U | | 1/1992 |
| JP | H04352839 A | | 12/1992 |
| JP | 2000513072 A | | 10/2000 |
| JP | 2001316953 A | | 11/2001 |
| RU | 110532 U1 | | 11/2011 |
| WO | WO-95/00319 A1 | * | 1/1995 |
| WO | WO-98/54393 A1 | * | 12/1998 |
| WO | 2008083072 A1 | | 7/2008 |

* cited by examiner

END-FRAY RESISTANT HEAT-SHRINKABLE WOVEN SLEEVE, ASSEMBLY THEREWITH AND METHODS OF CONSTRUCTION THEREOF

BACKGROUND OF THE INVENTION

1. Technical Field

This invention relates generally to textile sleeves for protecting elongate members, and more particularly to woven sleeves.

2. Related Art

Wire harnesses, hoses, tubing and the like often must endure harsh environmental conditions in automotive, industrial, aerospace, marine and other applications. For example, wire harnesses may be subjected to excessive heat or vibrations during vehicle operation which can damage the wire harness and impair its operation and reduce its useful life. It is common to cover wire harnesses with protective sleeves to protect them from the effects of such harsh environments. One such sleeve includes a woven substrate incorporating a plurality multifilaments and/or monofilaments that are made of an engineered plastics material that can be heat set to form a generally tubular, wrappable product. The filaments near the ends of the sleeve tend to protrude, fray and/or fall out when the product is cut to length and during use. Apart from being aesthetically unpleasing and diminishing the useful life of the sleeve, the frayed, protruding filaments can contaminate the tubes, hoses or wire harnesses about which the sleeve is disposed by interfering with the ability to properly connect end fittings or couplings with their mating parts.

SUMMARY OF THE INVENTION

One aspect of the invention provides a woven sleeve for routing and protecting elongate members from exposure to abrasion and other environmental conditions, such as contamination. The sleeve has a flexible, abrasion resistant, circumferentially closed and continuous elongate wall extending lengthwise along a central axis between opposite ends. The wall is woven with warp yarns extending generally parallel to the central axis and at least one heat-shrinkable weft yarn extending generally transversely to the warp yarns. The warp yarns provide the sleeve with coverage, abrasion resistance and flexibility and the weft yarn provides the ability to shrink the wall about an elongate member being protected within a cavity of the sleeve, as well as providing enhanced crush strength and abrasion resistance. At least one of the warp yarns and/or weft yarn includes at least one low melt, heat-fusible yarn served therewith to enhance resistance to end-fray during a cutting operation.

In accordance with another aspect of the invention, the at least one low melt, heat-fusible yarn is provided having a smaller diameter relative to the respective yarn with which it is served.

In accordance with another aspect of the invention, the weft yarn is provided as a monofilament of heat-shrinkable material with the at least one low melt, heat-fusible yarn served therewith.

In accordance with another aspect of the invention, the weft yarn has a pair of the low melt, heat-fusible yarns served therewith in opposite helical directions.

In accordance with another aspect of the invention, the warp yarns are provided as multifilaments.

In accordance with another aspect of the invention, the warp yarn is provided as a multifilament with the at least one low melt, heat-fusible yarn served therewith.

In accordance with another aspect of the invention, a textile sleeve assembly is provided. The assembly includes an elongate member and a circumferentially closed, tubular elongate wall providing a cavity in which the elongate member is disposed. The wall extends lengthwise along a central axis between opposite ends and is woven with warp yarns extending generally parallel to the central axis and at least one heat-shrinkable weft yarn extending generally transversely to the warp yarns. At least one of the warp yarns or the weft yarn includes at least one low melt, heat-fusible yarn served helically therewith. The at least one low melt, heat-fusible yarn is at least partially melted and forms a bond with the warp yarns and the at least one heat-shrinkable weft yarn, and the at least one heat-shrinkable weft yarn is shrunk about the elongate member.

In accordance with another aspect of the invention, a method of constructing a textile sleeve is provided. The method includes weaving an elongate wall having a circumferentially closed wall extending lengthwise along a central axis between opposite ends. The weaving is performed by weaving warp yarns extending generally parallel to the central axis and at least one heat-shrinkable weft yarn extending generally transversely to the warp yarns. The warp yarns provide the sleeve with coverage, abrasion resistance and flexibility and the weft yarn provides the ability to shrink the wall about an elongate member being protected within a cavity of the sleeve, as well as providing enhanced crush strength and abrasion resistance. The method further includes providing at least one of the warp and weft yarns with at least one low melt, heat-fusible yarn served therewith to enhance resistance to end-fray during a cutting operation, and then, cutting the wall to length.

In accordance with another aspect of the invention, the method further includes providing the at least one low melt, heat-fusible yarn having a diameter that is less than the diameter of the yarn about which it is served.

In accordance with another aspect of the invention, the method includes providing the weft yarn as a monofilament of heat-shrinkable material and serving the at least one low melt, heat-fusible yarn therewith.

In accordance with another aspect of the invention, the method includes serving a pair of the low melt, heat fusible yarns in opposite helical directions about the heat-shrinkable weft yarn.

In accordance with another aspect of the invention, the method includes providing the warp yarns as multifilaments.

In accordance with another aspect of the invention, the method includes performing the cutting in a cold-cutting process.

In accordance with another aspect of the invention, the method further includes at least partially melting the low melt, heat-fusible yarn without heat-shrinking the weft yarn prior to performing the cutting process.

In accordance with another aspect of the invention, the method further includes heat-shrinking the weft yarn, and thus reducing the diameter of the wall, after disposing an elongate member in a cavity of the sleeve.

In accordance with another aspect of the invention, a method of constructing a textile sleeve assembly is provided. The method includes providing an elongate member and weaving an elongate wall having a circumferentially closed wall extending lengthwise along a central axis between opposite ends. The wall is woven by weaving warp yarns extending generally parallel to the central axis and at least one heat-shrinkable weft yarn extending generally transversely to the warp yarns. Further, at least one of the warp or weft yarns has at least one low melt, heat-fusible yarn served therewith. The method further includes at least partially melting the at least one low melt, heat-fusible yarn without substantially shrinking the at least one heat-shrinkable weft yarn. Then, upon at least partially melting the at least one low melt, heat-fusible yarn, the method includes cutting the wall to length. Then, disposing the elongate member in a cavity of the cut wall and then shrinking the wall about the elongate member in a heating process.

BRIEF DESCRIPTION OF THE DRAWINGS

These and other aspects, features and advantages will become readily apparent to those skilled in the art in view of the following detailed description of presently preferred embodiments and best mode, appended claims, and accompanying drawings, in which:

DETAILED DESCRIPTION OF PREFERRED EMBODIMENTS

Figure 1:
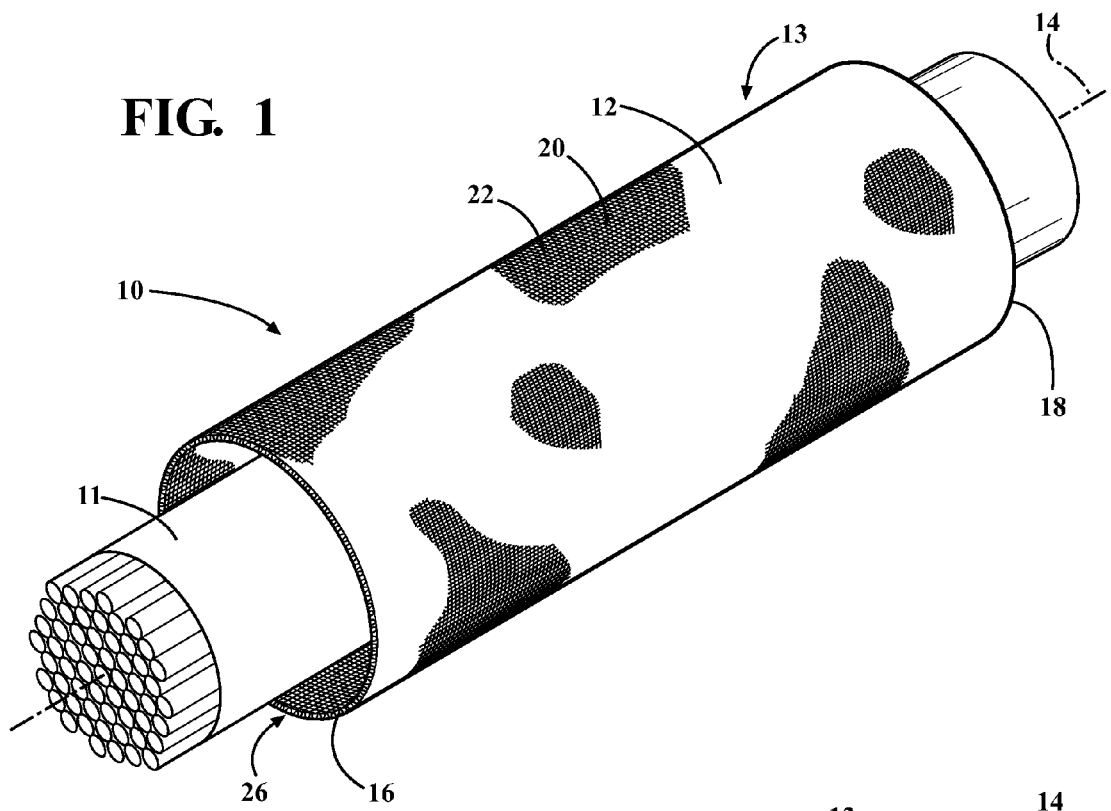
FIG. 1 is a perspective view of a woven sleeve for routing and protecting elongate members therein constructed in accordance with one aspect of the invention with a wall of the sleeve shown in a pre-shrunk configuration.

Referring in more detail to the drawings, FIGS. 1 (prior to heat-shrinking) and 1A (after heat-shrinking) show a woven sleeve 10 for routing and protecting elongate members 11 from exposure to abrasion and other environmental conditions, such as contamination, wherein the sleeve 10 and elongate members 11 form an assembly 13. The sleeve 10 has a flexible, abrasion resistant, circumferentially closed, seamless and tubular continuous elongate wall 12 extending lengthwise along a central axis 14 between opposite ends 16, 18. The wall 12 is woven with a plurality of ends of warp yarns 20 extending generally parallel to the central axis 14 and at least one heat-shrinkable weft yarn 22 extending generally transversely to the warp yarns 20. The warp yarns 20 provide the sleeve with coverage, abrasion resistance and flexibility and the weft yarn 22 provides the ability to shrink the wall 12 about the elongate member 11 being protected within a cavity 26 of the sleeve 10, as well as providing enhanced crush strength and abrasion resistance. The warp yarns 20 and/or the weft yarn 22 include at least one low melt, heat-fusible yarn 28 served therewith to enhance resistance to end-fray during a cutting operation by bonding the weft and warp yarns 20, 22 with one another. Depending on the application needs, the wall 12 can be constructed having any suitable size, including length and diameter.

Figure 2A:
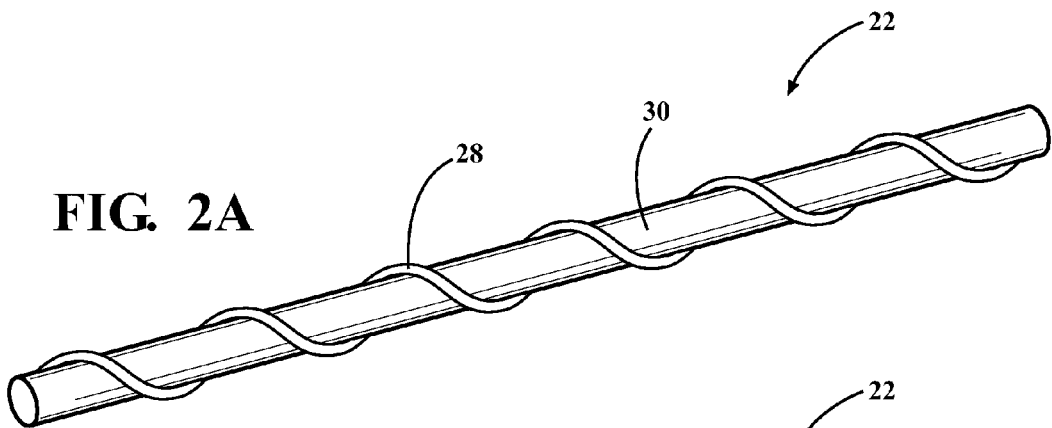
FIG. 2A is an enlarged partial perspective view of a weft yarn of the sleeve of FIG. 1 in accordance with one aspect of the invention.

In accordance with one aspect of the invention, the weft yarn 22 is provided in part as a heat-shrinkable monofilament 30 of a polymeric material (FIGS. 2A and 2B), such as polyethylene (PE), for example, having a diameter between about 0.20-0.40 mm, for example, wherein a sample was made having a diameter of 0.38 mm. Further, the weft yarn 22 includes the low melt, heat-fusible yarn 28 served therewith, shown in FIG. 2A as a single low melt, heat-fusible yarn 28 served helically about the monofilament 30. The low melt, heat-fusible yarn 28 has a lower melt temperature than the heat-shrinkable monofilament 30, which allows the low melt, heat-fusible yarn 28 to be at least partially melted without causing the heat-shrinkable monofilament 30 to shrink, or without causing the heat-shrinkable monofilament 30 to shrink substantially. Further, the low melt, heat-fusible yarn 28 is provided in all the embodiments having a significantly reduced diameter relative to the yarn about which it is served, and is generally provided having a diameter of within a range of about 0.05-0.10 mm. As such, the amount of material used for the low melt, heat-fusible yarn 28 is minimized, thereby reducing cost of the sleeve 10, while at the same time enhancing the ability to attain clean, substantially end-fray free cut ends 16, 18. Meanwhile, the warp yarn 20 is provided as a non-heat-shrinkable polymeric multifilament 32 having a denier of about 1250, such as from polyethylene terephthalate (PET), for example, as shown in FIG. 3A. The multifilaments 32 provide added surface area coverage to the wall 12, thereby further protecting the cavity 20 and the elongate members 24 against ingress of contamination, and further, the multifilaments 32 act to maintain the weft monofilaments 30 in their intended location, even under external abrasion force, while also enhancing the flexibility of the wall 12.

Figure 2B:
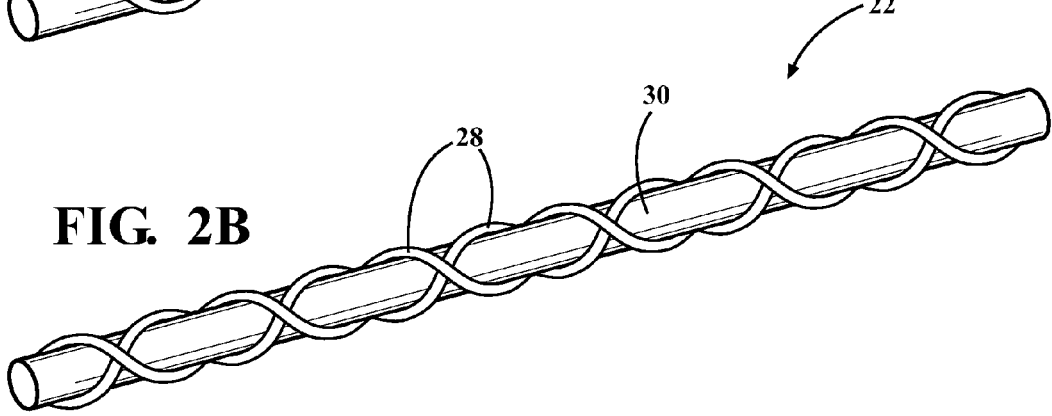
FIG. 2B is an enlarged partial perspective view of a weft yarn of the sleeve of FIG. 1 in accordance with another aspect of the invention.
Figure 3A:
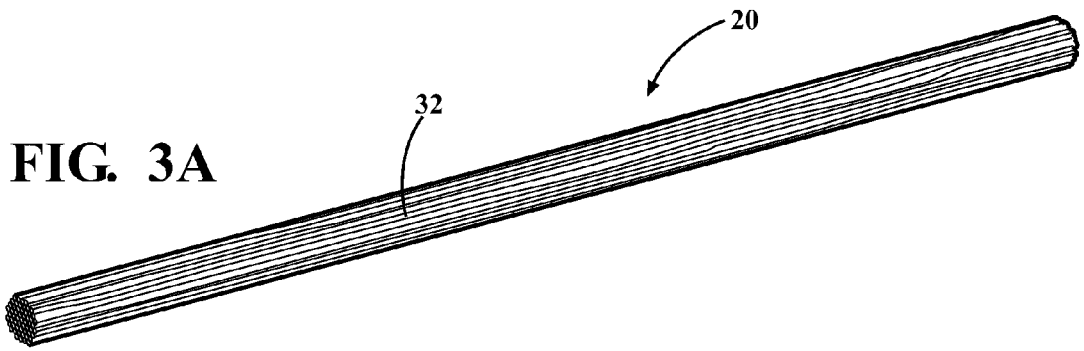
FIG. 3A is an enlarged partial perspective view of a warp yarn of the sleeve of FIG. 1 in accordance with another aspect of the invention.

In accordance with another aspect of the invention, the sleeve 10 can be constructed with weft yarn 22 as shown in FIG. 2B, wherein a pair of the low melt, heat-fusible yarns 28 are served in opposite helical directions about the heat-shrinkable weft monofilament 30, while the warp yarns 20 remain as discussed above and as shown in FIG. 3A. Again, given the significantly reduced diameter of the low melt, heat-fusible yarns 28, the amount of material used remains significantly less than if they were the same size as the yarns about which they are served. Having a pair of low melt, heat-fusible yarns 28 not only enhances the ability to bind the warp and weft yarns 20, 22 to one another to prevent end-fray during a cold-cut cutting operation and thereafter during use, but they also provide a balance to the yarn 22 given the opposite helical wrapping of the low melt, heat-fusible yarns 28.

Figure 2C:
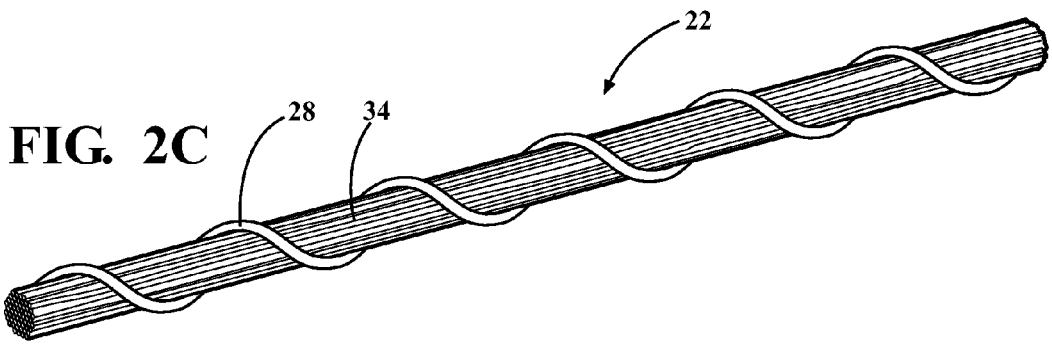
FIG. 2C is an enlarged partial perspective view of a weft yarn of the sleeve of FIG. 1 in accordance with another aspect of the invention.

In accordance with another aspect of the invention, the sleeve 10 can be constructed with weft yarn 22 as shown in FIG. 2C, wherein the weft yarn 22 is provided in part as a heat-shrinkable multifilament 34 of a polymeric material, such as polyethylene (PE), for example. Further, the weft yarn 22 includes a single low melt, heat-fusible yarn 28 served helically about the multifilament 34. Meanwhile, the warp yarns 20 remain as discussed above and as shown in FIG. 3A.

Figure 2D:
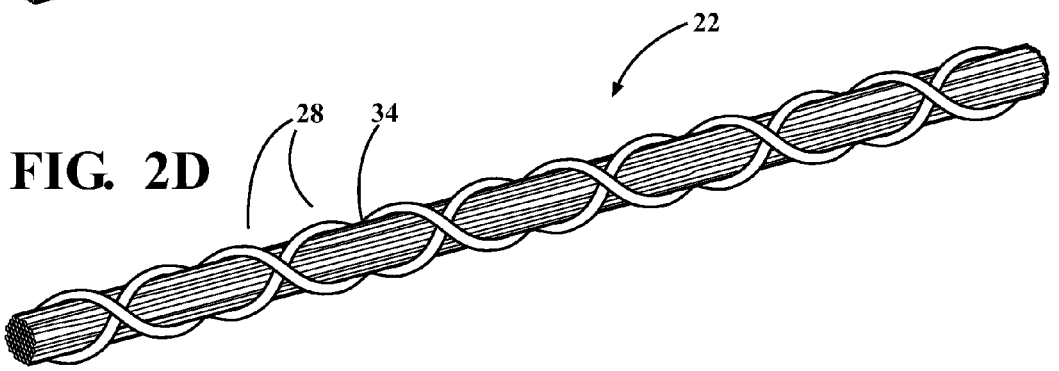
FIG. 2D is an enlarged partial perspective view of a weft yarn of the sleeve of FIG. 1 in accordance with another aspect of the invention.

In accordance with another aspect of the invention, the sleeve 10 can be constructed with weft yarn 22 as shown in FIG. 2D, wherein a pair of the low melt, heat-fusible yarns 28 are served in opposite helical directions about the heat-shrinkable weft multifilament 34, while the warp yarns 20 remain as discussed above and as shown in FIG. 3A.

Figure 3B:
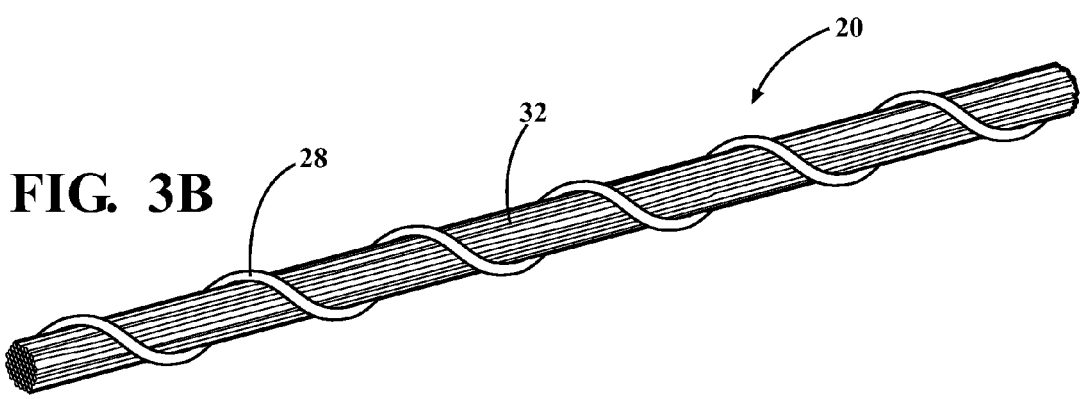
FIG. 3B is an enlarged partial perspective view of a warp yarn of the sleeve of FIG. 1 in accordance with another aspect of the invention.

In accordance with another aspect of the invention, the sleeve 10 can be constructed with warp yarn 20 as shown in FIG. 3B, wherein a single low melt, heat-fusible yarn 28 is served helically about each of the non-heat-shrinkable warp multifilaments 32, while the weft yarn 22 can remain as discussed above and as shown in FIGS. 2A-2D, or the weft yarn 22 can be provided having only the heat-shrinkable monofilament 30 without the served low melt yarn 28.

Figure 3C:
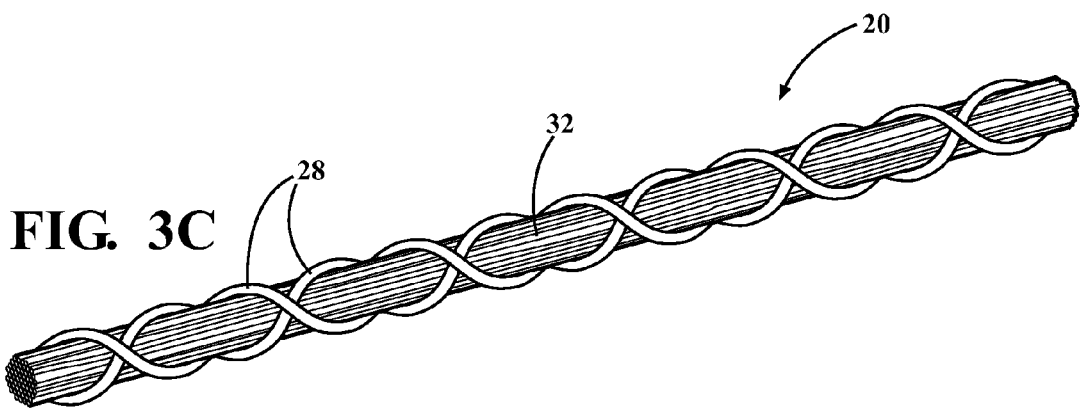
FIG. 3C is an enlarged partial perspective view of a warp yarn of the sleeve of FIG. 1 in accordance with another aspect of the invention.

In accordance with another aspect of the invention, the sleeve 10 can be constructed with warp yarn 20 as shown in FIG. 3C, wherein a pair of the low melt, heat-fusible yarns 28 are served in opposite helical directions about each of the non-heat-shrinkable warp multifilaments 30, while the weft yarn 22 can remain as discussed above and as shown in FIGS. 2A-2D, or the weft yarn 22 can be provided having only the heat-shrinkable monofilament 30 without the served low melt yarn 28.

Figure 1A:
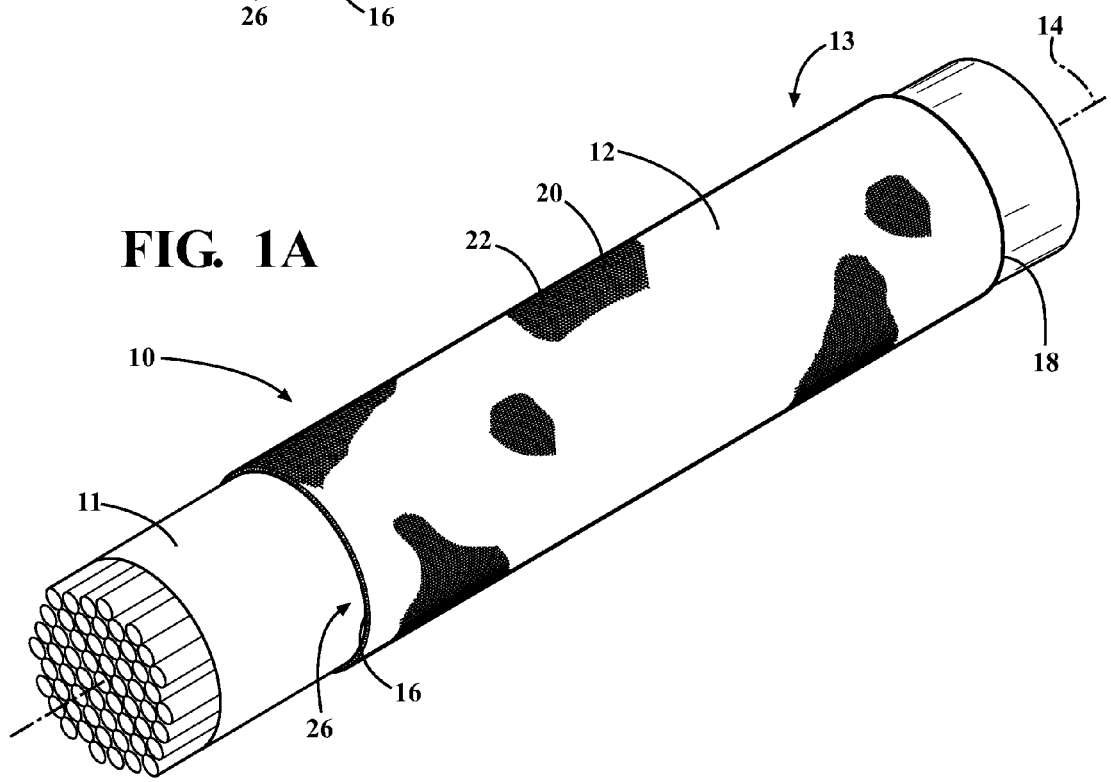
FIG. 1A is a view similar to FIG. 1 showing the wall of the sleeve in a shrunk configuration about the elongate member.

Upon forming the sleeve 10, using one of the embodiments discussed above, by weaving an elongate wall 12 having a circumferentially closed, seamless wall construction extending lengthwise along a central axis 14 between opposite ends 16, 18 by weaving warp yarns 20 extending generally parallel to the central axis 14 and at least one heat-shrinkable weft yarn 22 extending generally transversely to the warp yarns 20, with at least one of the warp and weft yarns 20, 22 having at least one low melt, heat-fusible yarn 28, a heating process is performed to at least partially melt the low melt, heat-fusible yarn 28. It should be recognized that the heating process performed to at least partially melt the low melt, heat-fusible yarn 28 is performed at a temperature suitable to melt or at least partially melt the low melt, heat-fusible yarn 28 without causing the heat-shrinkable yarn 30, 34 to shrink. As such, as shown in FIG. 1, the low melt, heat-fusible yarn 28 is at least partially melted to bond the warp and weft yarns 20, 22 together prior to cold-cutting the wall 12 to the desire length, but the wall 12 retains or substantially retains its "as woven" diameter, which has yet to be shrunk, so that the elongate member 11 can be easily disposed in the cavity 26 prior to heat-shrinking the wall 12. Accordingly, upon heating the wall 12 at a temperature sufficient to melt the low melt, heat-fusible yarn 28, a further process of cutting, and preferably cold-cutting the wall 12 to length is performed, thereby reducing the manufacturing cost associated with cutting, at which time the ends 16, 18 are formed having a clean, end-fray free cut due to the warp and weft yarns 20, 22 being bonded together by the melted material of the low melt, heat-fusible yarn 28. Then, the sleeve 12 is ready for use, wherein the elongate member 11 can be readily disposed in the enlarged cavity 26, and then a further heating operation is performed at an increased temperature, relative to the temperature used to melt the low melt, heat-fusible yarn 28, thereby causing the heat-shrinkable weft yarn 22 to shrink to bring the wall 12 into a relatively snug, shrunk fit about the elongate member 11 to form the completed sleeve and wire harness assembly 13, as shown in FIG. 1A.

Obviously, many modifications and variations of the present invention are possible in light of the above teachings. It is, therefore, to be understood that within the scope of the appended claims, the invention may be practiced otherwise than as specifically described, such that any of the weft yarns 22 illustrated in FIGS. 2A-2D can be woven with any of the warp yarns 20 illustrated in FIGS. 3A-3C.

What is claimed is:

1. A method of constructing a flexible textile sleeve assembly, comprising:

providing an elongate member;

weaving an elongate wall having a circumferentially closed wall extending lengthwise along a central axis between opposite ends by weaving warp yarn extending generally parallel to the central axis with weft yarn including at least one heat-shrinkable weft yarn extending generally transversely to the warp yarn with at least one of the warp or weft yarns having a diameter between about 0.20-0.40 mm including at least one low melt, heat-fusible yarn having a diameter between about 0.05-0.10 mm served thereabout;

at least partially melting the at least one low melt, heat-fusible yarn at a first temperature without substantially shrinking the at least one heat-shrinkable weft yarn;

cutting the wall to length;

disposing the elongate member in a cavity of the wall; and heating the at least one heat-shrinkable weft yarn in the wall to a second temperature greater than said first temperature and shrinking the wall about the elongate member.

* * * * *